United States Patent
Watanabe et al.

(10) Patent No.: US 9,638,529 B2
(45) Date of Patent: May 2, 2017

(54) VEHICLE ORIENTATION DETECTION METHOD AND VEHICLE ORIENTATION DETECTION APPARATUS

(71) Applicant: DENSO CORPORATION, Kariya, Aichi-pref. (JP)

(72) Inventors: Yuusuke Watanabe, Anjo (JP); Yuya Higuchi, Chiryu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/767,869

(22) PCT Filed: Jan. 22, 2014

(86) PCT No.: PCT/JP2014/000301
§ 371 (c)(1),
(2) Date: Aug. 13, 2015

(87) PCT Pub. No.: WO2014/125769
PCT Pub. Date: Aug. 21, 2014

(65) Prior Publication Data
US 2015/0369614 A1    Dec. 24, 2015

(30) Foreign Application Priority Data
Feb. 18, 2013 (JP) .................... 2013-029032

(51) Int. Cl.
*G01S 1/00* (2006.01)
*G01S 19/21* (2010.01)
(Continued)

(52) U.S. Cl.
CPC ............. *G01C 21/26* (2013.01); *G01C 21/28* (2013.01); *G01S 19/13* (2013.01); *G01S 19/53* (2013.01)

(58) Field of Classification Search
USPC ...................... 701/468; 342/357.59; 702/150
See application file for complete search history.

(56) References Cited

U.S. PATENT DOCUMENTS 4,821,831 A    4/1989  Onishi
5,179,519 A    1/1993  Adachi et al.
(Continued)

FOREIGN PATENT DOCUMENTS

JP    S63223338 A    9/1988
JP    H03226622 A    10/1991
(Continued)

OTHER PUBLICATIONS

International Search Report and Written Opinion (in Japanese with English Translation) for PCT/JP2014/000301, mailed Feb. 18, 2014; ISA/JP.

*Primary Examiner* — Tyler Paige
(74) *Attorney, Agent, or Firm* — Harness, Dickey & Pierce, P.L.C.

(57) ABSTRACT

In this vehicle orientation detection method detecting the orientation of a vehicle on the basis of measurement data obtained at prescribed time intervals, as long as a speed sensed by a vehicle speed sensor is less than a threshold speed, the vehicle orientation is detected on the basis of a yaw rate sensed by a yaw rate sensor. If the speed detected by the vehicle speed sensor is greater than or equal to the threshold speed, a drift determination is performed. If not determined to be in a drift state, the vehicle orientation is detected on the basis of signals received by a GPS receiver, and if determined to be in a drift state, the vehicle orientation is detected on the basis of the yaw rate sensed by the yaw rate sensor.

8 Claims, 8 Drawing Sheets

(51) Int. Cl.
*G01C 19/00* (2013.01)
*G01C 21/26* (2006.01)
*G01C 21/28* (2006.01)
*G01S 19/13* (2010.01)
*G01S 19/53* (2010.01)

(56) References Cited

U.S. PATENT DOCUMENTS

| | | | | |
|---|---|---|---|---|
| 5,555,503 A * | 9/1996 | Kyrtsos | | G08G 1/202 342/357.24 |
| 5,862,511 A | 1/1999 | Croyle et al. | | |
| 6,029,111 A * | 2/2000 | Croyle | | G01C 21/165 701/468 |
| 6,308,134 B1 * | 10/2001 | Croyle | | G01C 21/16 340/990 |
| 6,789,014 B1 * | 9/2004 | Rekow | | G01C 21/165 180/9.38 |
| 2002/0165646 A1 * | 11/2002 | Bohr | | B62D 6/005 701/1 |
| 2004/0128036 A1 * | 7/2004 | Arndt | | B60T 8/172 701/1 |
| 2007/0118286 A1 * | 5/2007 | Wang | | G01C 21/165 342/357.59 |
| 2010/0030471 A1 * | 2/2010 | Watanabe | | G01C 21/26 701/494 |
| 2010/0039318 A1 * | 2/2010 | Kmiecik | | G01C 21/165 342/357.59 |
| 2010/0174566 A1 * | 7/2010 | Helitzer | | G06Q 40/08 705/4 |
| 2012/0053834 A1 * | 3/2012 | Loomis | | G01S 19/47 701/510 |
| 2012/0191268 A1 * | 7/2012 | Martin | | G01M 17/007 701/1 |
| 2014/0005975 A1 * | 1/2014 | Ruizenaar | | G01C 17/38 702/150 |
| 2015/0369614 A1 * | 12/2015 | Watanabe | | G01C 21/26 701/468 |

FOREIGN PATENT DOCUMENTS

| | | |
|---|---|---|
| JP | H08014922 A | 1/1996 |
| JP | 2000506604 A | 5/2000 |
| JP | 2000284830 A | 10/2000 |
| JP | 2006071474 A | 3/2006 |
| JP | H07104171 A | 3/2006 |
| JP | 2011122921 A | 6/2011 |

* cited by examiner

— TRAVEL PATH
→ VEHICLE ORIENTATION
--→ GPS ORIENTATION

— TRAVEL PATH
→ VEHICLE ORIENTATION
--→ GPS ORIENTATION

VEHICLE ORIENTATION DETECTION METHOD AND VEHICLE ORIENTATION DETECTION APPARATUS

CROSS REFERENCE TO RELATED APPLICATIONS

This application is a U.S. National Phase Application under 35 U.S.C. 371 of International Application No. PCT/JP2014/000301 filed on Jan. 22, 2014 and published in Japanese as WO 2014/125769 A1 on Aug. 21, 2014. This application is based on and claims the benefit of priority from Japanese Patent Application No. 2013-029032 filed Feb. 18, 2013. The entire disclosures of all of the above applications are incorporated herein by reference.

TECHNICAL FIELD

The present disclosure relates to a vehicle orientation detection method and a vehicle orientation detection apparatus.

BACKGROUND ART

As a method of detecting an orientation toward which a vehicle travels, that is, a vehicle orientation (a heading orientation), there is a method of calculating the vehicle orientation with orientation information calculated from a global positioning system (GPS) signal, or a method of calculating the vehicle orientation with a gyro. In the method of calculating the vehicle orientation according to the GPS signal, when a vehicle speed is slower, a travel distance for each time becomes shorter, and a calculation precision in the vehicle orientation is deteriorated. Thus, a method of calculating the vehicle orientation with the orientation information calculated according to the GPS signal when the vehicle speed is equal to or greater than a reference speed, and calculating the vehicle orientation with the use of the gyro when the vehicle speed is less than the reference speed has been proposed.

However, when the method is used, the following drawbacks may arise. For example, when a limit travel is performed in, for example, a circuit, a situation such as a drift in which tires are not gripped on a road surface may occur. In this case, by the above method, even when the vehicle speed is equal to or greater than the reference speed, the vehicle orientation calculated on the basis of the GPS signal may be different from an actual vehicle orientation, and an accurate vehicle orientation may not be calculated.

PRIOR ART DOCUMENT

Patent Literature

PTL 1: JP H3-226622A

SUMMARY OF INVENTION

It is an object of the present disclosure to provide a vehicle orientation detection method and a vehicle orientation detection apparatus that enable to detect a vehicle orientation with precision even when tires are not gripped on a road surface during travel of a vehicle, when vehicle information acquired during travel is used after travel and the vehicle orientation is calculated.

According to one aspect of the present disclosure, a vehicle orientation detection method detects a vehicle orientation on the basis of data measured at each predetermined time interval when a vehicle travels, the vehicle including a GPS receiver that receives a signal of a GPS satellite, a yaw rate sensor that detects a yaw rate, a lateral acceleration sensor that detects a lateral acceleration, and a vehicle speed sensor that detects a vehicle speed. When a detection speed of the vehicle speed sensor is less than a reference speed, the vehicle orientation is detected on the basis of the yaw rate detected by the yaw rate sensor. When the detection speed of the vehicle speed sensor is equal to or greater than the reference speed, drift determination is performed. When the vehicle is not determined as a drift state, the vehicle orientation based on a received signal of the GPS receiver is detected. When the vehicle is determined as the drift state, the vehicle orientation on a basis of the yaw rate detected by the yaw rate sensor is detected.

According to the vehicle orientation detection method, when the drift state is determined even when the vehicle speed is equal to or greater than the reference speed, the vehicle orientation is detected on the basis of the yaw rate detected by the yaw rate sensor. According to the configuration, even when the vehicle orientation detected on the basis of the received signal of the GPS receiver is deviated, it may be possible that the vehicle orientation closer to an actual state is detected with a reduction in an error.

According to another aspect of the present disclosure, a vehicle orientation detection apparatus includes a vehicle speed determination portion, a drift determination portion, and a vehicle orientation detection portion, and detects a vehicle orientation of a vehicle on a basis of a GPS signal received by a GPS receiver from a GPS satellite at each predetermined time interval, a yaw rate detected by a yaw rate sensor at each predetermined time interval, a lateral acceleration detected by a lateral acceleration sensor at each predetermined time interval, and a vehicle speed detected by a vehicle speed sensor at each predetermined time interval. The vehicle speed determination portion determines whether the vehicle speed detected by the vehicle speed sensor is equal to or greater than a reference speed regarding each data at each predetermined time interval. When the vehicle speed determination portion determines that the vehicle speed is equal to or greater than the reference speed, the drift determination portion determines whether the vehicle is in a drift state. The vehicle orientation detection portion detects the vehicle orientation on a basis of the yaw rate of the yaw rate sensor when the vehicle speed determination portion determines that the vehicle speed is less than the reference speed, and when the drift determination portion detects the drift state, and detects the vehicle orientation on a basis of a received signal of the GPS receiver when the vehicle speed determination portion determines that the vehicle speed is equal to or greater than the reference speed, and when the drift determination portion detects the drift state.

When the drift state is determined even when the vehicle speed is equal to or greater than the reference speed, the vehicle orientation detection apparatus detects the vehicle orientation on the basis of a yaw rate value detected by the yaw rate sensor. According to the configuration, even when the vehicle orientation detected on the basis of the received signal of the GPS receiver is deviated, it may be possible that the vehicle orientation closer to an actual state is detected with a reduction in an error.

BRIEF DESCRIPTION OF DRAWINGS

The above and other objects, features and advantages of the present disclosure will become more apparent from the following detailed description made with reference to the accompanying drawings. In the drawings.

PREFERRED EMBODIMENTS FOR CARRYING OUT THE INVENTION

An embodiment of the present disclosure will be described with reference to FIG. 1 to FIG. 8. In the present embodiment, a vehicle orientation is detected by performing arithmetic processing on the basis of vehicle travel information detected during travel of a vehicle. Acquisition of the vehicle travel information and the arithmetic processing will be described.

Figure 2:
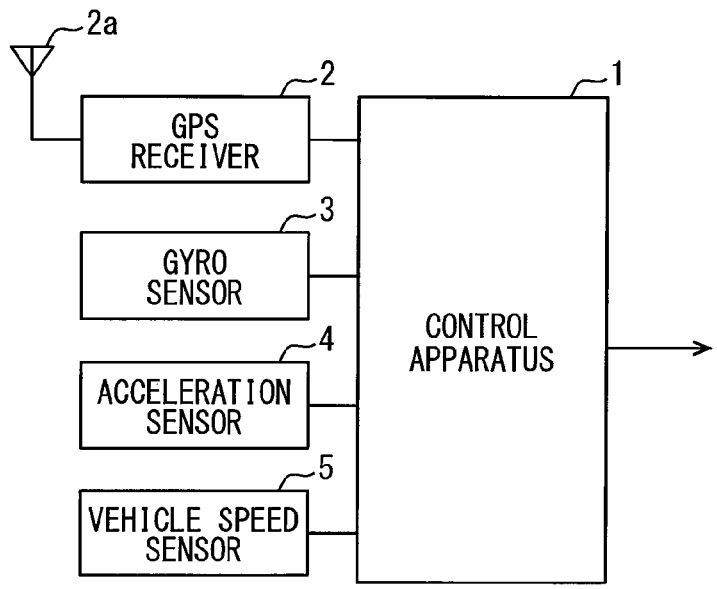
FIG. 2 is a diagram illustrating a configuration acquiring vehicle information indicating a state of a vehicle during travel.

FIG. 2 illustrates a configuration to acquire the vehicle travel information. The vehicle has a control apparatus 1 calculating a travel path and the vehicle orientation through a dead reckoning (DR). The control apparatus 1 has a memory and an input/output interface around a CPU.

The control apparatus 1 is connected with a GPS receiver 2, a gyro 3, an acceleration sensor 4, and a vehicle speed sensor 5, and receives various data therefrom. The control apparatus 1 is an example of a vehicle speed determination portion, a drift determination portion, and a vehicle orientation detection portion.

The GPS receiver 2 receives electric wave from multiple GPS satellites through a GPS antenna 2a, and obtains a GPS signal for detecting position information and speed information. The gyro 3 acquires information of turning in a vertical direction of the vehicle as a yaw rate value yr_gy of an angular speed. The acceleration sensor 4 detects a lateral acceleration GY of the vehicle. The vehicle speed sensor 5 acquires data of a travel speed v of the vehicle.

The various data is sampled at intervals of, for example, 100 ms (milliseconds), and the sampled data is stored in a nonvolatile memory as the vehicle travel information. In this case, the time intervals at which the data is sampled may be shorter or longer than 100 ms. When the time intervals are shortened, the vehicle orientation can be detected with high precision, and when the time intervals are lengthened, the arithmetic processing can be performed in a short period of time.

The vehicle orientation (a heading orientation) of the vehicle is detected by the control apparatus 1 on the basis of the acquired vehicle travel information. In FIG. 2, the control apparatus 1 detects the vehicle orientation. In the present embodiment, after the vehicle travel information has been acquired, the vehicle orientation is detected on the basis of the vehicle travel information. A process of detecting the vehicle orientation at each detection timing of the vehicle travel information is not performed. Therefore, the vehicle travel information that has been accumulated and stored in the nonvolatile memory once may be detected by using not the control apparatus 1 but arithmetic means such as a microcomputer or a personal computer, separately.

Figure 3A:
FIG. 3A is a diagram illustrating a relationship between a path and an orientation of the vehicle during gripping.
Figure 3B:
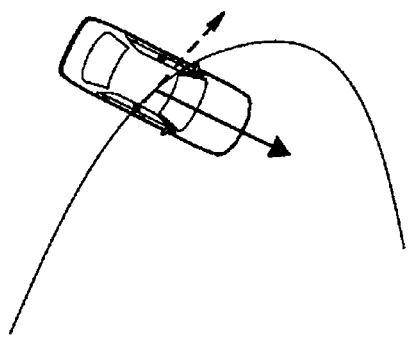
FIG. 3B is a diagram illustrating a relationship between a path and an orientation of the vehicle during drifting.
Figure 3C:
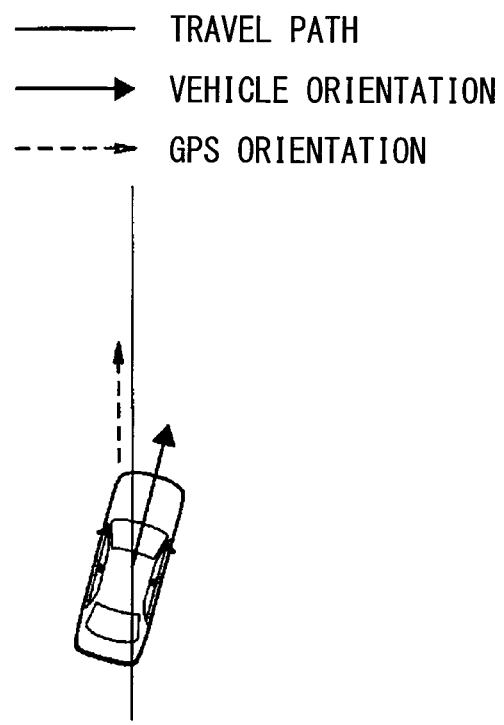
FIG. 3C is a diagram illustrating a relationship between a path and an orientation of the vehicle when an error occurs.

When the vehicle orientation is calculated after the travel information has been acquired, when the vehicle normally travels, the vehicle is gripped on a road surface of a road, and in straight travel, as illustrated in FIG. 3A, the travel path of the vehicle matches the vehicle orientation. That is, when the vehicle is gripped on the road surface, the vehicle orientation detected according to the GPS signal matches an actual vehicle orientation. When the vehicle extremely travels and becomes in a drift state, as illustrated in FIG. 3B, the GPS orientation of the vehicle does not match the actual vehicle orientation. When an error due to the deviation is left, as illustrated in FIG. 3C, uncomfortable feeling occurs in a straight state.

Thus, when the vehicle orientation is calculated only by a dead reckoning output, since an orientation precision of the dead reckoning generally has about a few degrees/sec on an angle basis, the uncomfortable feeling may increase due to the error. So, when the vehicle speed is high, the error may be reduced to 1 [°/s] (degrees/sec) or less with the vehicle orientation calculated according to the GPS signal. Accordingly, it may be possible to detect the vehicle orientation with the compensation of a drawback that the error increases. Further, when the drift state occurs, the vehicle orientation obtained through the dead reckoning is used during the drift period to suppress the occurrence of the error.

Figure 4:
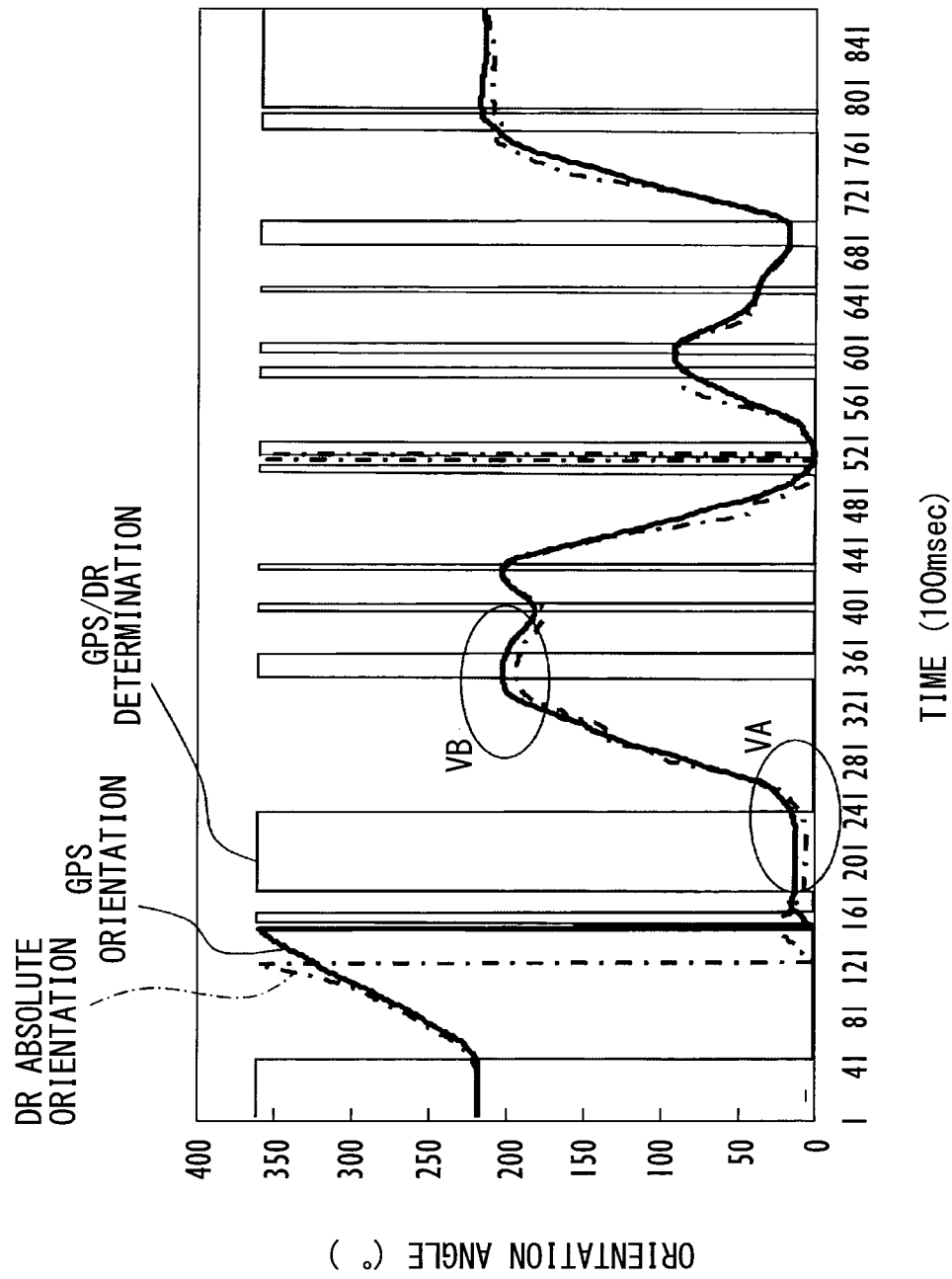
FIG. 4 is a diagram illustrating a temporal transition of a GPS orientation and a DR absolute orientation of the vehicle.
Figure 5A:
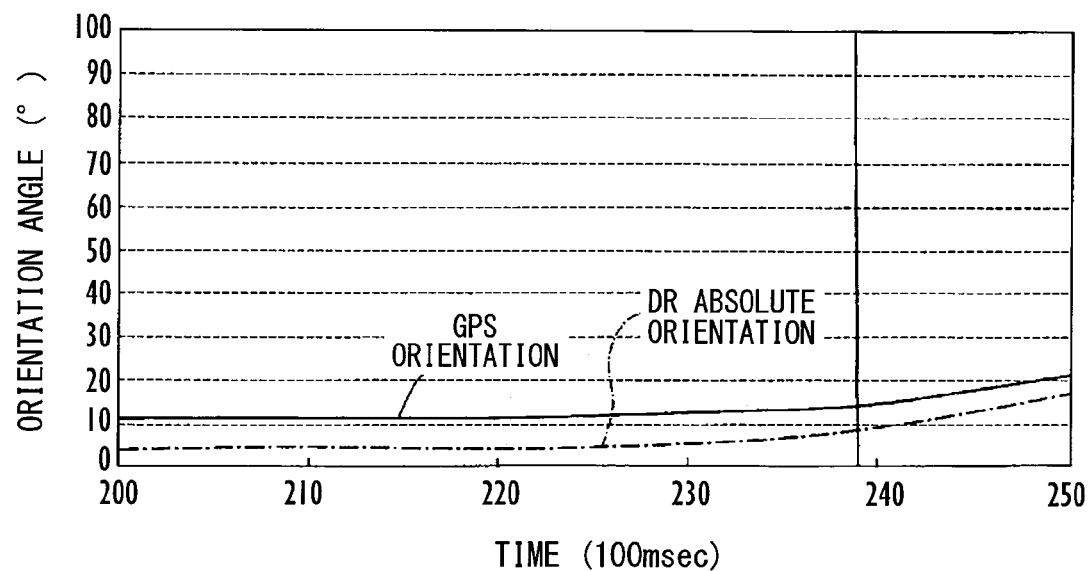
FIG. 5A is a diagram illustrating a deviation between the GPS orientation and the DR absolute orientation before a drift period in a part VA of FIG. 4.
Figure 5B:
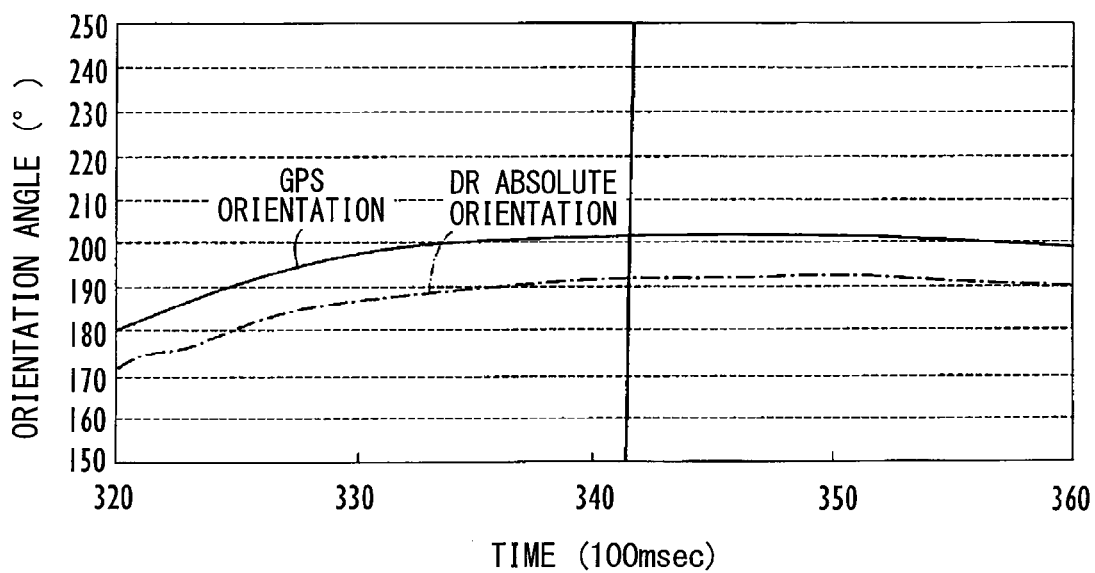
FIG. 5B is a diagram illustrating a deviation between the GPS orientation and the DR absolute orientation after the drift period in a part VB of FIG. 4.
Figure 6A:
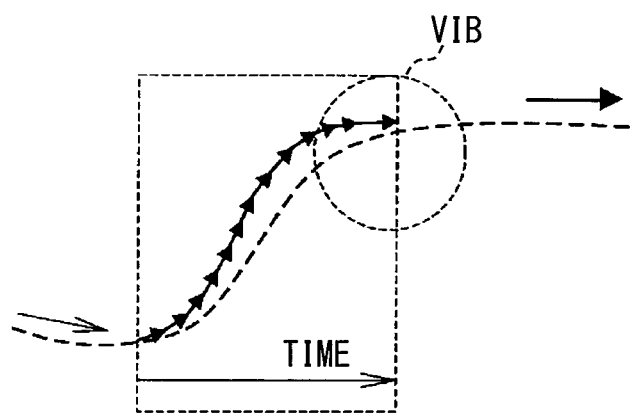
FIG. 6A is a diagram illustrating an error between the GPS orientation and the DR absolute orientation.
Figure 6B:
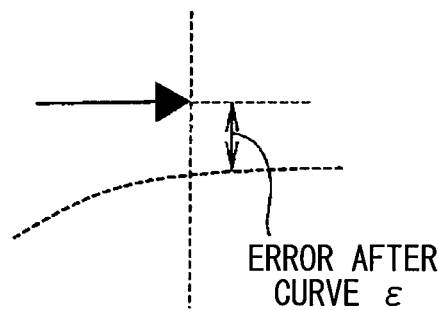
FIG. 6B is an enlarged view of a part VIB in FIG. 6A.

As illustrated in FIG. 4, a deviation occurs between the absolute orientation obtained through the dead reckoning (DR) and the orientation obtained according to the GPS signal in the measurement when the vehicle travels, and the following unnatural path may occur. It is supposed that the detection of the vehicle orientation switches between the GPS orientation and the DR orientation in a period (for example, a period of time 240 to time 340) in which the drift occurs, for example, in a curve illustrated in FIG. 4. In this case, between FIG. 5A corresponding to a situation before the vehicle becomes in the drift state in a curve and FIG. 5B when the vehicle escapes from the drift state after the curve, an error occurs in the GPS orientation and the DR absolute orientation. Thus, when a method of detecting the vehicle orientation is switched to another, an error ε illustrated in FIG. 6B occurs at the time of the end of the period of the drift state illustrated in FIG. 6A, and an unnatural path may be calculated.

Figure 1:
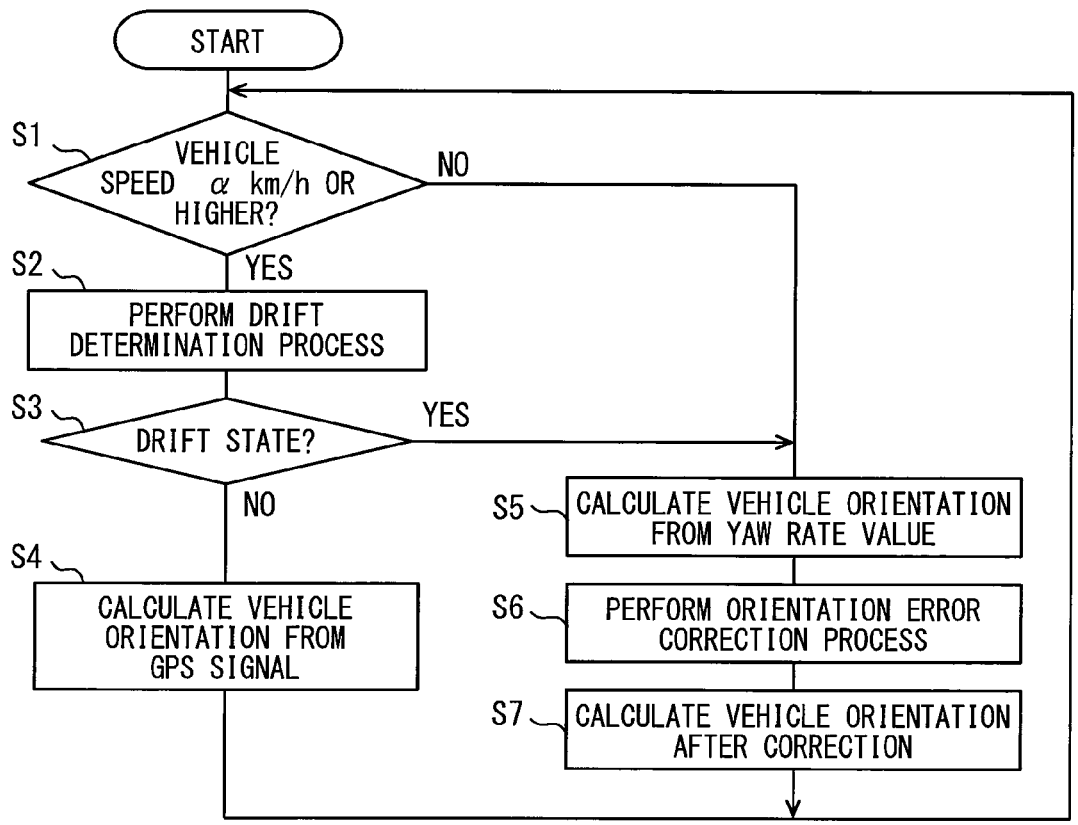
FIG. 1 is a flowchart illustrating a process of calculating a vehicle orientation according to vehicle data according to one embodiment of the present disclosure.

In the present embodiment, the vehicle orientation is calculated according to a procedure illustrated in FIG. 1. It may be possible to prevent the mismatched state or the uncomfortable feeling from occurring. The control apparatus 1 initially determines whether the vehicle speed is equal to or greater than α km/h, or not, for the vehicle travel information acquired at the respective timing (S1). When the travel speed is equal to or greater than a certain degree, the vehicle orientation with the use of the GPS received information can be precisely determined. The speed of α km/h is a boundary. The speed α may be set to an appropriate speed such as 18, 20, and may be set to, for example, any value in a range from 15 to 25.

When the travel speed is equal to or greater than α km/h (S1: YES), the control apparatus 1 implements a drift determination process (S2). The drift determination process will be described later. When it is determined that the vehicle is not in the drift state in the drift determination process (S2) (S3: NO), the control apparatus 1 calculates the vehicle orientation according to the GPS signal (S4).

When the vehicle orientation is detected according to the GPS signal, the control apparatus 1 calculates a relative movement from a previous position, and calculates the orientation of the vehicle on the basis of the relative movement. In this case, since no drift state occurs, it is estimated that the vehicle is oriented in a direction substantially along a travel path.

By contrast, when the vehicle speed is equal to or greater than α km/h, and the drift state is determined in the drift determination process (S3: YES), the control apparatus 1 calculates the vehicle orientation on the basis of the yaw rate value detected by the gyro 3 (S5). In this example, since the drift state occurs, and since the orientation of the vehicle is deviated from the vehicle orientation obtained by the GPS signal, the control apparatus 1 calculates an angle corresponding to this deviation. In this process, the control apparatus 1 further corrects an orientation error described later (S6), and calculates the vehicle orientation after correction (S7).

In a correction process of the orientation error (S6), at the time of switching between the calculation of the vehicle orientation based on the GPS signal from the GPS receiver 2 and the calculation of the vehicle orientation based on the gyro 3, when an error occurs between the vehicle orientations, the control apparatus 1 performs a correction process for smoothly connecting those vehicle orientations.

Figure 7:
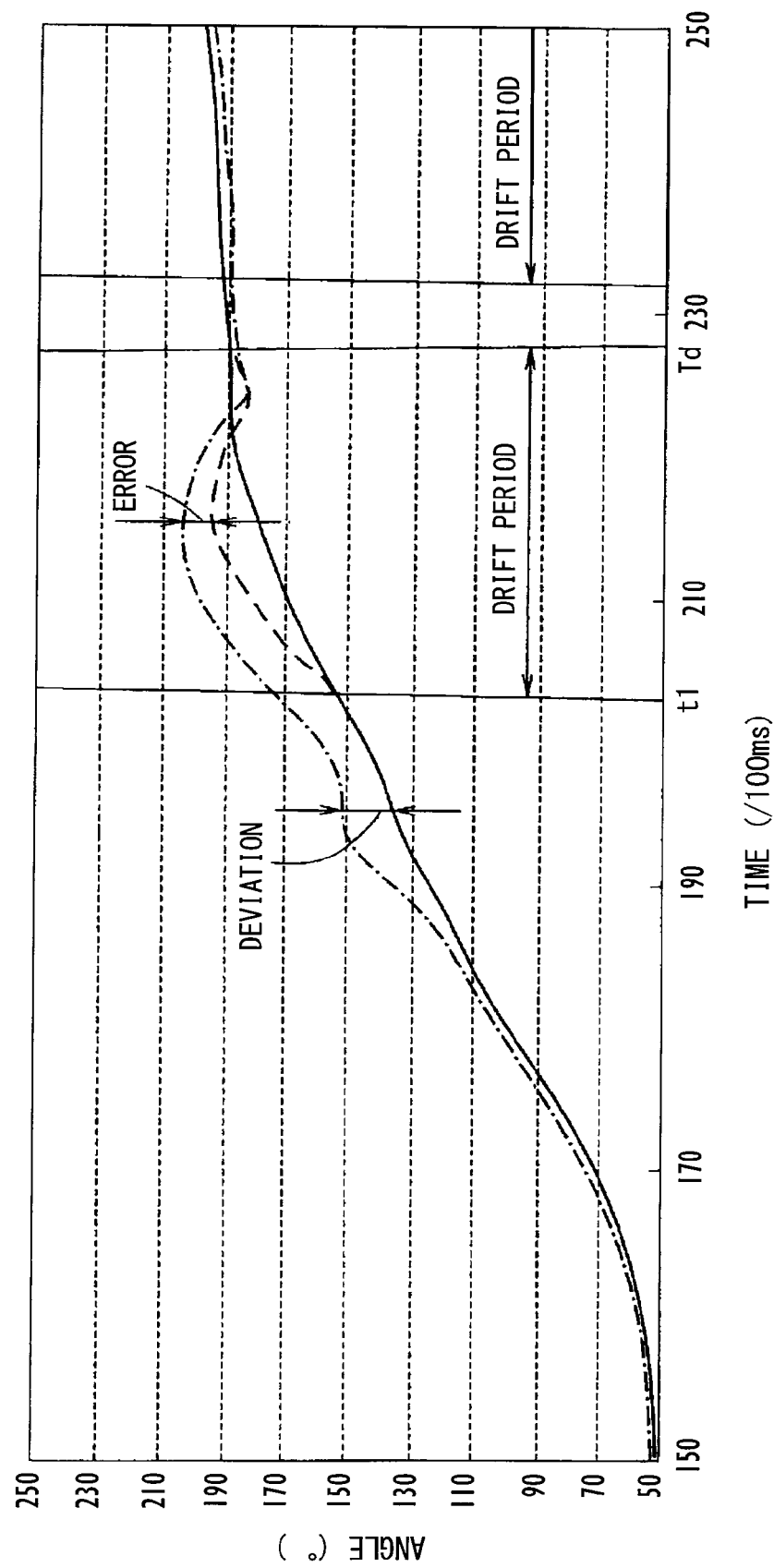
FIG. 7 is a diagram illustrating a deviation occurring before the drift period and an error occurring in the relative orientation.

It is expected that the drift state in the actual vehicle occurs at the time of entering the curve. However, in the process of the drift determination, the drift determination is performed at a time when a value of the difference in the acceleration obtained from a difference between the yaw rate value of the gyro 3 and the lateral acceleration becomes equal to or greater than a predetermined threshold. Therefore, as illustrated in FIG. 7, it is supposed that, at the time of determining the drift state, a deviation occurs between the vehicle orientation based on the GPS signal and the vehicle orientation based on the yaw rate value of the gyro 3. This situation may occur at the time of determining the end of the drift state.

When the error occurs, and when the calculation of the orientation based on the GPS signal and the calculation of the orientation based on the yaw rate value are switched at timing of determining the drift state, the orientation rapidly changes due to the error occurring at the time, and uncomfortable feeling may occur. Thus, the vehicle orientation is matched to the vehicle orientation based on the GPS signal at the time of transitioning to the drift state, and then, a change in the relative vehicle orientation obtained from the yaw rate data is added to the vehicle orientation based on the GPS signal so as to smoothly connect the vehicle orientations during the period of the drift state.

The error occurring while switching to the vehicle orientation based on the GPS signal at the time of determining the end of the drift state is evenly distributed retroactively to data of the vehicle orientation within the period of the drift state. Thus, a correction process for eliminating the error at the time of determining the end of the drift state is performed.

When the vehicle speed is not equal to or greater than α km/h (S1: NO), the control apparatus 1 calculates the vehicle orientation on the basis of the yaw rate value detected by the gyro 3 as is the case of the drift state (S5 to S7). In this case, the occurrence of the drift state is not determined. Since the vehicle speed is low, it is conceivable that the drift state hardly occurs, and no substantially correction process of the orientation error occurs.

When a series of processing is executed as described above, the control apparatus 1 returns to S1, and repetitively executes the processing. Accordingly, it is possible that the control apparatus 1 calculates the vehicle orientation corresponding to all of the vehicle travel information.

The drift determination process in step S2 of FIG. 1 will be explained. In this example, it is noted that, when the vehicle extremely travels such as drift travel as the vehicle orientation, the orientation calculated on the basis of the signal of the yaw rate value output from the gyro 3 is correct as compared with the orientation calculated from the GPS signal. It is also noted that, as compared with a normal grip travel, in the drift travel, a relationship of the lateral acceleration, the yaw rate value based on the gyro 3, and the vehicle speed is lost.

In other words, data at each time point is assigned to a calculation expression representing a relationship of the lateral acceleration gy [m/s$^2$], the yaw rate value yr_gy [°/s], and the vehicle speed v [m/s], and when the relational expression is not satisfied, the drift state is detected. Specifically, a drift determination expression is set, and when a calculated value is equal to or greater than a reference value, the vehicle orientation is changed from the GPS orientation to the orientation calculated by the gyro 3 to solve the matter.

The drift determination expression is based on a relationship represented by the following expression. In the grip state where no grip occurs, since the yaw rate value detected by the gyro 3 becomes equal to a value obtained by dividing the lateral acceleration gy by the vehicle speed v, the relationship of the following expression (1) is established.

$$yr\_gy = gy/v \tag{1}$$

yr_gy: yaw rate value ([°/s], [dps])
v: vehicle speed [m/s]
gy: lateral acceleration sensor value [m/s$^2$]

In the drift state, since the relationship of expression (1) is lost, and the drift state may be detected when a difference therebetween is calculated, and is equal to or greater than the drift determination value. In this case, after the yaw rate value yr_gy is converted into a radian value yr, a value w of a difference between those values is obtained by expression (2). The value w of the difference in the acceleration is converted into a value ω_gy based on a gravity acceleration G (=9.8 [m/s$^2$]) illustrated in expression (3).

$$yr = (yr\_gy) \times 2\pi/360 \ [rad/s]$$

$$\omega = gy - (yr \times v) \tag{2}$$

$$\omega\_gy = \omega/9.8 \tag{3}$$

In this case, since the calculated value of ω_gy is obtained by directly converting a detection output, a variation is large. Under the circumstances, the determination is performed by a value T (expression (4)) obtained by converting the value of ω_gy so as to cut off a high frequency component through a low pass filter such as a butterworth filter.

$$T=(b_0+b_1z^{-1}+b_2z^{-2}+b_3z^{-3}+b_4z^{-4})/(1+a_1z^{-1}+a_2z^{-2}+a_3z^{-3}+a_4z^{-4}) \quad (4)$$

Figure 8:
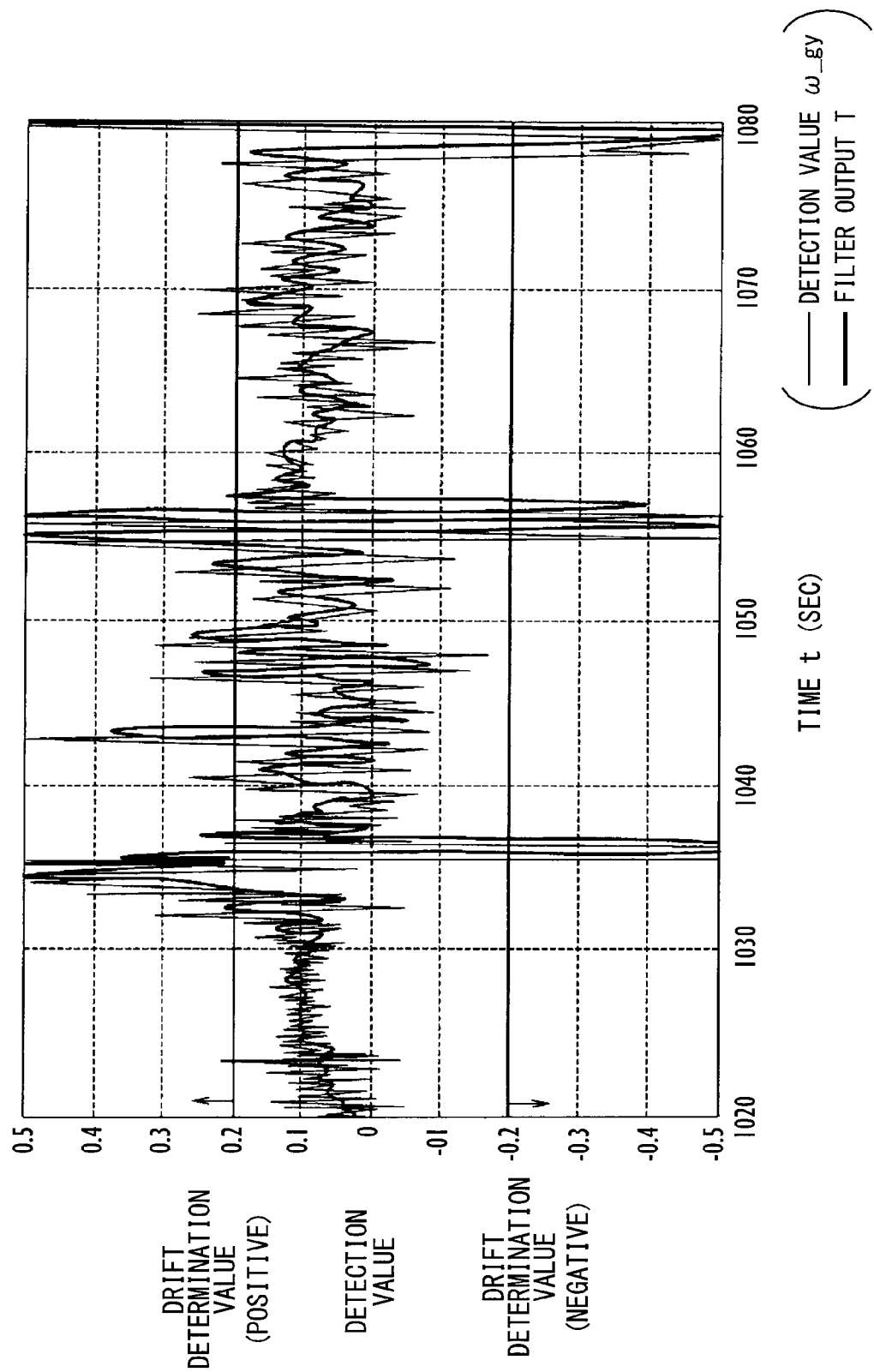
FIG. 8 is a diagram illustrating a temporal transition of a detection value and a filter output.

The value T obtained as described above is compared with a drift determination reference value (for example, 0.2), and when a difference exceeding the drift determination reference value occurs, the drift state is detected. FIG. 8 illustrates a state of a change in the detection value ω_gy and the filter output T, which are detected as time elapses. The detection value ω_gy is finely varied with time. It may be possible that the filter output T is obtained with a small variation where high frequency components are removed. A state that becomes equal to or greater than the positive and negative drift determination value is determined.

When the drift state is detected, the vehicle orientation is changed from the GPS orientation to the orientation calculated based on the yaw rate value yr_gy of the gyro 3. In this case, in order to prevent changeover of the determination from becoming unstable in the vicinity of the drift determination value in performing the drift determination, the drift determination value may be made different between a detection start time point and a detection end time point of the drift state as a process of providing a hysteresis.

In an actual vehicle motion, an error of 10 [°/s] or less may be calculated at a stage earlier than a time point when the drift state is detected on the basis of the relational expression of the yaw rate value yr_gy, the lateral acceleration gy, and the vehicle speed v. Under the circumstances, even when the yaw rate value yr_gy reaches a predetermined threshold level, the error is reduced by performing the drift determination.

Specifically, the determination is performed as follows. In this example, in order to prevent the drift determination from being unstable in the vicinity of the determination level, the determination conditions are made different between the detection start time point and the detection end time point of the drift state. Regarding the end determination of the drift state, a state in which a status satisfying the determination condition is continued for a predetermined time (for example, 1 second) is determined, and accordingly, the end of the drift state is detected.

In the determination conditions of the detection start time point of the drift state, a time point when an absolute value of the value T converted to cut off the high frequency component through the butterworth filter represented by the expression (4) is equal to 0.2 or greater is set as a first condition represented by expression (5). Whether a value of a relative vehicle orientation $DR_{rel}D(t)$ of the vehicle orientation detected by the gyro 3 at a time t is deviated from a value of a relative vehicle orientation $DR_{rel}D(t-1)$ at a previous time t-1 by an angle of 10 degrees or larger is set as a second condition represented by expression (6). The drift state is detected at a time point when any one of the first condition and the second condition is detected.

$$|T(n)| \geq 0.2 \quad (5)$$

$$|DR_{rel}D(t)-DR_{rel}D(t-1)| \geq 10 \text{ [dps]} \quad (6)$$

In the determination conditions of the detection end time point of the drift state, a time point when an absolute value of the value T converted to cut off the high frequency component through the butterworth filter represented by the expression (4) becomes 0.1 or lower is set as a first condition represented by expression (7). A value of a relative vehicle orientation $DR_{rel}D(t)$ of the vehicle orientation detected by the yaw rate value yr_gy at the time t falls within an angle of 10 degrees from a value of a relative vehicle orientation $DR_{rel}D(t-1)$ at the previous time t-1 is set as a second condition represented by expression (8). As described above, the end determination of the drift state is made when a status satisfying both of the first condition and the second condition is continued for one second.

$$|T(n)| > 0.1 \quad (7)$$

$$|DR_{rel}D(t)-DR_{rel}D(t-1)| \leq 10 \text{ [dps]} \quad (8)$$

The drift determination reference values are different between the expression (5) and the expression (7). In a range represented by expression (9), the determination result is prevented from becoming unstable as the hysteresis region.

$$0.1 < |T(n)| < 0.2 \quad (9)$$

As described above, the drift determination is performed with the first condition and the second condition of expression (5) to expression (9). Accordingly, it may be possible to ensure the determination of the start time point and the determination of the end time point of the drift state of the vehicle, and to precisely detect the vehicle orientation.

The determination of the drift state may be surely performed as described above. Regarding the calculation of the actual vehicle orientation, the following error may occur before and after the time point of the drift determination. That is, when the orientation based on the GPS signal is replaced with the vehicle orientation based on the yaw rate value yr_gy of the gyro 3 in the drift period, the vehicle orientation information calculated through two different methods is replaced with each other. When an error occurs between those orientations at the time of the drift determination, the vehicle orientation rapidly changes, so that an unnatural path may occur.

In order to prevent the unnatural change from occurring, a process of smoothly transitioning to the drift period is performed. For example, the DR relative orientation is used as a variation of the vehicle orientation based on the yaw rate value detected by the gyro 3, and the vehicle orientation is switched to another with the addition of the variation relative to the vehicle orientation based on the GPS signal. Accordingly, even when it is determined as the drift determination, it may be possible to smoothly shift the vehicle orientation, and to improve the precision further.

The vehicle orientation is smoothly connected to another during a period when the vehicle orientation based on the gyro 3 after the drift determination is calculated according to the variation. In switching to the vehicle orientation based on the GPS signal when the drift state is terminated after the curve, the accumulated error may occur. The error occurring at the time when the drift determination is terminated is dispersed on the respective data calculated as the vehicle orientation during the drift period, and corrected whereby, it may be possible to gradually eliminate the error during the drift determination period.

Incidentally, when curves such as S-shape are continuous and the vehicle orientation is changed in a reverse direction once during the drift determination period, the vehicle orientation may become a straight orientation in units of seconds. In this case, a detection precision of the vehicle orientation as high as a precision at the time of a straight line is required. When the vehicle orientation based on the GPS signal exceeds a predetermined threshold and reversed positively and negatively, straight determination is added. It is considered that the drift state is temporarily eliminated, and an error ε occurring at that time is corrected through the above method.

Specifically, the correction process is performed as follows.

Periods are set for time series data of a GPS speed vk as follows.

$$v_{a-15} \sim v_a, v_{a+1} \sim v_{a+x}, v_{t1} \sim v_{td}, v_{b-y} \sim v_{b-1}, v_b \sim v_{b+15}$$

$v_{a-15} \sim v_a \geq 18$ km/h: fixed period (A): the number of data pieces 16

$v_{a+1} \sim v_{a+x} < 18$ km/h: variation period (X): the number of data pieces x $v_{t1} \sim v_{td}$: drift detection period: the number of data pieces d $v_{b-y} \sim v_{b-1} < 18$ km/h: variation period (Y): the number of data pieces y $v_b \sim v_{b+15} \geq 18$ km/h: fixed period (B): the number of data pieces 16

In this condition, when the number of data pieces x and y in the variation periods (X) and (Y) satisfy x<y, the DR absolute orientation ($DR_{abs}(n)$) is calculated with 16 pieces of data in the fixed period (A), which is temporally closer to the drift detection period.

The orientation $\theta_{GPS}$ of each speed $v_k$ based on the GPS signal in the fixed period (A) is calculated according to a northward speed component $v_n$ and an eastward speed component $v_e$ through an expression (10). An average value $\theta_{GPS \cdot ave}$ is calculated. An average value $\theta_{DR \cdot rel \cdot ave}$ of the DR relative orientation $DR_{rel}$ Direction in the fixed period (A) is calculated through an expression (11).

$$\theta_{GPS \cdot ave} = \text{average}([\arctan(v_n/v_e)]_{a-15 \sim a}) \quad (10)$$

$v_n$: northward speed component of $v_k$
$v_e$: eastward speed component of $v_k$ $$\theta_{DR \cdot rel \cdot ave} = \text{average}(DR_{rel} \text{Direction}_{a-15 \sim}) \quad (11)$$

The DR absolute orientation $DR_{abs}(n)$ at each time point n is calculated through expression (12) and expression (13) with values obtained by the expression (10) and the expression (11).

$$\theta_{DR \cdot abs}(n) = \theta_{DR \cdot rel}(n) + (\theta_{GPS \cdot ave} - \theta_{DR \cdot rel \cdot ave}) \quad (12)$$

$$DR_{abs}(n) = V(n) \times \theta_{DR \cdot abs}(n) \quad (13)$$

$\theta_{GPS \cdot ave}(n)$: vehicle speed [m/s]

When x>y, the DR absolute orientation ($DR_{abs}(n)$) is calculated through expression (12) and expression (13) with the use of 16 pieces of data in the fixed period (B) that is temporally closer to the drift detection period. In this case, an average value $\theta_{GPS \cdot ave}$ based on the GPS orientation represented by the expression (10) and an average value $\theta_{DR \cdot rel \cdot ave}$ based on the DR relative orientation $DR_{rel}$ Direction represented by expression (12) are replaced with values represented by expression (14) and expression (15), respectively.

$$\theta_{GPS \cdot ave} = \text{average}(\arctan[(v_n/v_e)_{b \sim b+15}]) \quad (14)$$

$$\theta_{DR \cdot rel \cdot ave} = \text{average}(DR_{rel} \text{Direction}_{b \sim b+15}) \quad (15)$$

The error $\epsilon$ between a relative DR integral orientation and the GPS orientation at the time of an end of the drift detection period is corrected. A value of the error $\epsilon$ is obtained by an expression (16). A correction amount in an interpolation period is obtained by adding the correction amount to a value of each DR absolute orientation in a period for interpolation with the error $\epsilon$, as represented by expression (17).

$$\text{Error } \epsilon = \Sigma(DR_{abs}\theta(t_k) - GPS\theta(t_k)), k=1 \sim e \quad (16)$$

$$\text{Interpolation period } DR_{abs}\theta_{comp}(t_k) = DR_{rel}\theta(t_k) + \epsilon/t_e \quad (17)$$

The vehicle orientation is:

Interpolation period vehicle orientation information=$\Sigma DR_{abs}\theta_{comp}(t_k)$, k=1~e.

With the addition of the correction amount to the value of the DR absolute orientation in the interpolation period, when the vehicle orientation switches to the value of the vehicle orientation based on the GPS signal even before and after the drift period, it may be possible that the vehicle orientation is smoothly connected to another, and the uncomfortable feeling is prevented from occurring.

According to the embodiment, it may be possible to obtain the advantages.

When the vehicle orientation is detected based on the vehicle travel information, when the drift state is determined by performing the drift determination process under a condition where the detection speed of the vehicle speed sensor 5 is equal to or greater than the reference speed α [km/h], the vehicle orientation is detected by the gyro 3. As a result, when the drift state is determined even under the condition where the vehicle speed is equal to or greater than the reference speed, even when the vehicle orientation is deviated from the vehicle orientation based on the GPS signal, it may be possible that the vehicle orientation closer to the actual state is detected with a reduction in the error.

In the process of the drift determination, it is determined as the drift when the value of the difference between the lateral acceleration value detected by the acceleration sensor 4 and the acceleration value in the lateral direction obtained from the yaw rate value detected by the gyro 3 and the vehicle speed value detected by the vehicle speed sensor 5 is equal to or greater than the drift determination value. Accordingly, it is surely determined that the vehicle is in the drift state, and it may be possible that the vehicle orientation without any uncomfortable feeling is detected.

The process of the drift determination, when the end of the drift state is determined, sets the drift end determination value smaller than the drift determination value. Accordingly, even when the value of the difference for performing the determination is varied in the vicinity of the drift determination value, it may be possible to prevents the state of the drift determination from being frequently varied.

The process of the drift determination, besides performing the drift determination, determines as the drift state even when the yaw rate value detected by the gyro 3 is equal to or greater than a drift determination angular speed. Accordingly, in the drift determination based on the difference in the lateral acceleration, it may be possible to detect the drift state occurring before the detection value reaches the drift determination value, and it may be possible to prevent the uncomfortable feeling from occurring in the detection results of the vehicle orientation.

In switching from the vehicle orientation based on the GPS to the vehicle orientation based on the gyro 3 at the time of determining the drift state, when the orientation difference occurs between the vehicle orientations, the interpolation process is used so as to disperse and regulate components of the orientation difference during the period of the drift state. It may be possible to smoothly connect the vehicle orientations to each other in switching.

In the interpolation process, in switching from the vehicle orientation based on the GPS to the vehicle orientation based on the gyro 3, when the orientation difference occurs between the vehicle orientations, the interpolation process is used so as to evenly distribute and regulate the components of the orientation difference to the information on each vehicle orientation during the period of the drift state. It may be possible to smoothly connect the vehicle orientations to each other with a simple process in switching.

In performing the drift determination, since the value of the difference in the lateral acceleration is not directly determined, but determined based on the signal passed through the low pass filter, it may be possible to perform the determination process of the drift state more stably.

Other Embodiments

The present disclosure is not limited to only one embodiment described above, but can be applied to various embodiments without departing from the spirit of the present disclosure, and can be modified or expanded, for example, as follow.

The drift determination level for detecting the drift state can be set to an appropriate level according to various factors such as a travel status of the vehicle, a pattern of the road, or a state of the detected signal. Likewise, the drift end determination level can be set to an appropriate level. With the above setting, regulation can be performed such that a sensitivity of the determination of the drift state can be enhanced, or the erroneous determination is avoided according to the level of the noise.

The high frequency signal components are cut off from the value of the signal ω_gy of the difference in the lateral acceleration through the butterworth filter, but filters other than the butterworth filter can be also applied when those filters function as low pass filters.

In the embodiment, the drift determination process S2 is performed according to the flowchart of FIG. 1, but the drift determination process may be performed before the process S1 for determining the vehicle speed is performed. In this case, S2 and S3 are executed in advance, and when the determination result is NO in S3, the same advantages can be obtained with the execution of S1.

When the interpolation process S6 during the drift period is performed under the conditions where the drift state occurs, various modifications can be applied except for the case in which the error amount in the embodiment is evenly distributed to the respective vehicle orientation data during the drift period. For example, besides the system in which the error amount is evenly dispersed in all of measured data, the error amount can be added and dispersed for each predetermined data, or can be weighed according to the amount of variation of data during the drift period, and dispersed. Further, the error can be distributed through other appropriate methods.

What is claimed is:

1. A vehicle orientation detection method detecting a vehicle orientation on a basis of data measured at each predetermined time interval when a vehicle travels, the vehicle including a GPS receiver that receives a signal of a GPS satellite, a yaw rate sensor that detects a yaw rate, a lateral acceleration sensor that detects a lateral acceleration and a vehicle speed sensor that detects a vehicle speed, the vehicle orientation detection method comprising:
   detecting the vehicle orientation of the vehicle which travels less than a reference speed on a basis of the yaw rate detected by the yaw rate sensor when a detection speed of the vehicle speed sensor is less than the reference speed, the vehicle orientation being a heading orientation toward which the vehicle travels;
   performing drift determination to determine whether the vehicle is in a drift state when the detection speed of the vehicle speed sensor is equal to or greater than the reference speed;
   when the vehicle is not determined to be in the drift state in the drift determination, detecting the vehicle orientation on a basis of the signal received by the GPS receiver; and
   when the vehicle is determined to be in the drift state in the drift determination, detecting the vehicle orientation of the vehicle which travels at or greater than the reference speed on the basis of the yaw rate detected by the yaw rate sensor.

2. The vehicle orientation detection method according to claim 1, wherein:
   when a value of a difference between the lateral acceleration detected by the lateral acceleration sensor and an acceleration in a lateral direction obtained from the yaw rate and the vehicle speed is equal to or greater than a drift determination value, the drift determination determines that the vehicle is in the drift state;
   the yaw rate sensor detects the yaw rate; and
   the vehicle speed sensor detects the vehicle speed.

3. The vehicle orientation detection method according to claim 2, wherein:
   when the drift state is detected in the drift determination, and when the value of the difference is equal to or less than a drift end determination value that is smaller than the drift determination value, an end of the drift state is detected.

4. The vehicle orientation detection method according to claim 2, wherein:
   when the yaw rate detected by the yaw rate sensor is equal to or greater than a drift determination angular speed, the drift determination determines that the vehicle is in the drift state.

5. The vehicle orientation detection method according to claim 1, wherein:
   when the vehicle orientation based on the yaw rate is switched to the vehicle orientation based on the signal received by the GPS receiver at a time of an end of the drift state, and when an orientation difference occurs between the vehicle orientation based on the yaw rate and the vehicle orientation based on the signal received by the GPS receiver, an interpolation process is performed so as to disperse and add the orientation difference on each orientation data of the vehicle based on the yaw rate during a drift period.

6. The vehicle orientation detection method according to claim 5, wherein:
   the interpolation process equally disperses and adds a value of the orientation difference on the each orientation data of the vehicle based on the yaw rate during the drift period.

7. The vehicle orientation detection method according to claim 1, wherein:
   when a signal obtained from a value of a difference between the lateral acceleration detected by the lateral acceleration sensor and an acceleration obtained from the yaw rate detected by the yaw rate sensor and the vehicle speed detected by the vehicle speed sensor through a low pass filter is equal to or greater than the drift determination value, the drift determination determines that the vehicle is in the drift state.

8. A vehicle orientation detection apparatus that detects a vehicle orientation of a vehicle on a basis of a GPS signal that a GPS receiver receives from a GPS satellite at each predetermined time interval, a yaw rate detected by a yaw rate sensor at each predetermined time interval, a lateral acceleration detected by a lateral acceleration sensor at each predetermined time interval, and a vehicle speed detected by a vehicle speed sensor at each predetermined time interval, the vehicle orientation detection apparatus comprising:
- a vehicle speed determination portion determining whether the vehicle speed detected by the vehicle speed sensor is equal to or greater than a reference speed regarding each data at each predetermined time interval;
- a drift determination portion determining whether the vehicle is in a drift state when the vehicle speed determination portion determines that the vehicle speed is equal to or greater than the reference speed; and
- a vehicle orientation detection portion
    - detecting the vehicle orientation of the vehicle which travels less than the reference speed on a basis of the yaw rate of the yaw rate sensor when the vehicle speed determination portion determines that the vehicle speed is less than the reference speed, the vehicle orientation being a heading orientation toward which the vehicle travels,
    - detecting the vehicle orientation on a basis of the yaw rate of the yaw rate sensor when the drift determination portion has determined that the vehicle is in the drift state, and
    - detecting the vehicle orientation on a basis of a signal received by the GPS receiver other than a case where the vehicle speed determination portion determines that the vehicle speed is less than the reference speed and a case where the drift determination portion determines that the vehicle is in the drift state.

* * * * *